3,642,885
ISOMERIZATION OF CIS-CIS OR CIS-TRANS-2,4-HEXADIENOIC ACIDS TO SORBIC ACID
Lothar Heinz Hornig, deceased, late of Frankfurt am Main-Schwanheim, Germany, by Anneliese Hornig, nee Munich, heiress, Frankfurt am Main, Hermann Neu, Neu-Isenburg, and Otto Probst, Frankfurt am Main, Germany, assignors to Farbwerke Hoechst Aktiengesellschaft vormals Meister Lucius & Bruning, Frankfurt am Main, Germany
No Drawing. Continuation-in-part of application Ser. No. 431,446, Feb. 9, 1965. This application Mar. 30, 1970, Ser. No. 25,574
Claims priority, application Germany, Feb. 15, 1964, F 42,014
Int. Cl. C07c 51/00
U.S. Cl. 260—526 N                 9 Claims

ABSTRACT OF THE DISCLOSURE

The use of sulfur or hydrogen chloride as a catalyst in the isomerization of cis-cis and cis-trans hexadiene (2:4) acids to yield sorbic acid.

---

This application a continuation-in-part of application Ser. No. 431,446 filed Feb. 9, 1965, now abandoned.

The present invention relates to a process for preparing sorbic acid by the isomerization of cis-cis and cis-trans-hexadiene (2:4) acids.

Owing to their two double bonds hexadiene (2:4) acids may be present in the following four position-isomeric forms: trans-2, trans-4; cis-2, trans-4; trans-2, cis-4 and cis-2, cis-4. All four isomers are known. The hexadiene (2:4) acid in the trans-2, trans-4, form is called sorbic acid, which owing to its antimicrobe effect is used as preservative.

Various processes for the preparation of hexadiene acid have been known. It is known, for example, to prepare hexadiene acid by the condensation of crotonaldehyde and malonic acid, the reaction of crotonaldehyde with the zinc derivative of the ethyl ester of bromoacetic acid according to Reformatzky, the oxidation of hexadienal with silver compounds, the oxidation of 3:5-heptadiene with sodium hypochlorite or the splitting off of alkanols from 3:5-dialkoxy-caproic acid esters and saponification of the resulting hexadiene acid. In a particularly economic process hexadiene acids are prepared from the polymeric reaction product of crotonaldehyde and ketene (polyester). There are different possibilities of preparing hexadiene acids from the polyester. They may be prepared, for example, by the thermal splitting of the polyester in the presence of an alkali or by the alkaline saponification of the polyester and subsequent dehydration of the β-oxycarboxylic acids which form primarily. In the latter process a mixture of hexadiene acids is obtained in which sorbic acid is the main constituent and the cis isomers are present in varying proportions. These isomers have a lower melting point than sorbic acid and when they form they have an oily consistency. They make the purification of sorbic acid difficult and impair its stability. Moreover, when sorbic acid is prepared from the aforesaid polyester they diminish the yield. It has been proposed in the literature to use iodine and a strong alkali as isomerization catalysts for mono-unsaturated compounds. However, when these substances are used only a certain degree of conversion can be attained. Sulfur and hydrochloric acid have also been proposed for the isomerization of mono-unsaturated compounds. No industrial process has so far been known, however, in which the aforesaid substances are used for the isomerization of polyunsaturated compounds as for example hexadiene acids.

It has now been found that elementary sulfur and/or hydrogen chloride are highly effective as catalysts in the transformation of the cis isomers of hexadiene acid into its trans-trans isomers and enable an almost complete conversion into the trans-trans isomer, i.e. sorbic acid, to be obtained.

Although the use of sulfur and hydrochloric acid for the cis-trans isomerization of mono-unsaturated compounds has already been known it could not be foreseen that aliphatic diene compounds are also isomerized by these catalysts since, as in the case of hexadiene acid, four isomeric forms may be formed. It was surprising that only the trans-trans compound, i.e. sorbic acid, is obtained in the present case, for U.S. Pat. 2,794,017 describes the isomerization of linoleic acid, a doubly unsaturated acid, by sulfur or sulfur dioxide to more readily polymerizable compounds, that is to cis compounds, which is the opposite isomerization. That these more readily polymerizable compounds are cis compounds is evident from Fieser und Fieser, Organische Chemie, edited by Chemie GmbH, Weinheim/Bergstrasse (1965), page 1224, where it is said that "the process of drying is due to an oxidizing polymerization . . . the cis isomers being more sensitive than the trans compounds"; and from Kirk-Othmer, Encyclopedia of Chemical Technology, First Suppl. vol., New York (1957), page 845, reading as follows: "The cis isomers . . . are subject to autoxidation and will polymerize more readily than sorbic acid."

The sulfur may be used in the solid, liquid or vaporous state or in solution in an appropriate solvent for sulfur, for example, carbon disulfide or toluene. It may also be present in colloidal form. Moreover, the isomerizing effect of the sulfur does not depend on the modification in which it is present. It need, for example, not be present in the form of α- or δ-sulfur. The sulfur may also have been derived from compounds which under the isomerization conditions split off sulfur, for example, sulfur chlorides, thiosulfates, organic sulfur compounds or inorganic or organic polysulfides, or it may have been obtained by the reaction of compounds such as sulfides or sulfites which leads to the formation of free sulfur.

If the isomerization is to be carried out in the presence of hydrogen chloride this compound may be used in the gaseous state or in the form of concentrated hydrochloric acid. Sulfur and/or hydrogen chloride are in general used in a quantity within the range of 0.1 to 10%, preferably 1 to 5%, calculated on the proportion of cis-isomers, but it or they may also be used in smaller or larger quantities. The treatment with sulfur and/or hydrogen chloride is advantageously carried out in the presence of a solvent for the acid mixture. In this case the solvent must not react with hexadiene acids under the conditions of isomerization. As examples of suitable solvents there may be mentioned aliphatic, alicyclic and aromatic hydrocarbons, their chlorine, bromine or nitro derivatives, ethers and ketones. It is advantageous to carry out the isomerization at a temperature within the range of 20° C. to 300° C., preferably 100° to 220° C.

Which process is the most suitable one in a particular case depends on the method by which the mixture of hexadiene acids has been prepared. When the thermal splitting of a polyester which has been obtained by the reaction of crotonaldehyde with ketene, for example, according to the process described in German Pat. No. 1,042,573, is carried out in the presence of an alkali it may for example, be advantageous to add elementary sulfur or compounds splitting off sulfur during the thermal splitting process. It is then advantageous to heat the polyester in the form of a solution in a high-boiling inert solvent in an evaporator to a temperature within the range of 150° to 220° C., whereupon the mixture of hexadiene acids which forms by the splitting of the polyester distils off together with the solvent under an appropriate reduced pressure. According to another embodiment of the invention the thermal splitting of the polyester is first carried out in the absence of sulfur and the mixture of the hexadiene acids and the solvent is treated with sulfur and/or hydrogen chloride in a vessel that is separate from the splitting zone, the hydrogen chloride being preferably used in the form of hydrochloric acid. Mixtures of hexadiene acids as are prepared, for example, by the alkaline saponification of polyesters obtained by the reaction of crotonaldehyde with ketene, and by the subsequent dehydration with sulfuric acid are advantageously used as starting material for the process of the invention. These acid mixtures, which are generally light brown, still contain about 20 to 30% of sorbic acid and about 70 to 80% of cis isomers after the predominant part of the sorbic acid formed has been separated. By isomerizing these mixtures in accordance with the invention, acid mixtures are obtained which contain about 80 to 100% of sorbic acid.

The following examples serve to illustrate the invention. More particularly, the examples illustrate some possibilities of carrying out the isomerization of hexadiene acids by means of sulfur and hydrochloric acid. Examples 3b and 4b are given for comparison purposes. The percentages indicated in the examples are by weight.

EXAMPLE 1

A mixture of isomeric hexadiene acids as it is obtained in the form of an oily residue in the preparation of sorbic acid by alkaline saponification of the polyester and subsequent acid treatment in accordance with German Pat. 1,042,573, contained 21% of sorbic acid and 68% of cis isomers.

The mixture was used as starting product for the isomerization.

4 grams of concentrated hydrochloric acid were added to 100 grams of the residue and the mixture was heated to 80° C. After the treatment the mixture contained 79% of sorbic acid and 10% of cis isomers.

EXAMPLE 2

3 grams of elementary sulfur were added to 100 grams of a mixture of hexadiene acids which contained 24% of sorbic acid and 76% of cis isomers. The whole was then heated to 170° C. After this treatment the mixture contained more than 99% of sorbic acid.

EXAMPLE 3a 5 grams of concentrated hydrochloric acid were added to 100 grams of a mixture of hexadiene acids containing 24% of sorbic acid and 76% of cis isomers. The whole was then heated to 80° C. After this treatment the mixture contained 88% of sorbic acid and 12% of cis isomers.

EXAMPLE 3b

When the experiment described in Example 3a was repeated, the only difference being that 4 grams of a sodium hydroxide solution of 50% strength were added, the mixture which was obtained after the isomerization and subsequent acidification contained 34% of sorbic acid and 66% of cis isomers.

EXAMPLE 4a 100 grams of a mixture containing 24% of sorbic acid and 76% of cis isomers was boiled under reflux together with a solution of 0.9 gram of elementary sulfur in 50 grams of carbon disulfide. After this treatment the mixture contained 91% of sorbic acid and 9% of cis isomers.

EXAMPLE 4b

When the same molar quantities of iodine were used and the mixture of hexadiene acids was isomerized under otherwise the same conditions as described in Example 4a, a mixture of 30% of sorbic acid and 70% of cis isomers was obtained.

EXAMPLE 5

A vaporous mixture of hexadiene acids and diethylene glycol dibutyl ether which had been obtained by the thermal splitting of the polyester in the presence of alkali and diethylene glycol dibutyl ether and which comprised 15% of sorbic acid, 5% of cis isomers and 75% of glycol ether was passed over elementary sulfur at a temperature within the range of 110° C. and 120° C. under a pressure of 20 mm. of mercury. After having thus been treated the vaporous mixture contained 18.8% of sorbic acid, 1.2% of cis isomers and 75% of glycol ether.

What is claimed is:

1. In a process for isomerizing cis-cis or cis-trans hexadiene(2:4) acids to sorbic acid, the improvement which comprises utilizing sulfur or hydrogen chloride as an isomerization catalyst in an amount of 0.1 to 10% based on the weight of cis isomers to be isomerized.

2. A process for isomerizing cis-cis- or cis-trans hexadiene(2:4) acids to sorbic acid in an acid mixture resulting by alkaline hydrolysis of polyesters obtained by the reaction of crotonaldehyde with ketene and subsequent dehydration with an acid after removal of the greater part of the sorbic acid formed, which comprises utilizing sulfur or hydrogen chloride as an isomerization catalyst in an amount of 0.1 to 10% based on the weight of the cis isomers to be isomerized.

3. A process as in claim 1 wherein the isomerization is carried out in the presence of a solvent for the acid mixture.

4. A process as in claim 1 wherein the isomerization is carried out at a temperature within the range of 20° to 300° C.

5. A process as in claim 1 wherein the isomerization is carried out at a temperature within the range of 100° to 220° C.

6. A process as in claim 1 wherein the catalyst is used in an amount of 1 to 5% by weight and the isomerization is carried out at a temperature of 20° to 300° C.

7. A process as in claim 1 wherein the isomerization is carried out at a temperature of 20° to 300° C. and the sulfur is added to the isomerization reaction mixture in the form of a sulfur-containing compound that splits off elemental sulfur under the isomerization conditions.

8. A process for making sorbic acid which comprises reacting ketene with crotonaldehyde in an inert solvent to form a polyester, adding to the resulting reaction mixture elemental sulfur or a sulfur-containing compound capable of splitting off elemental sulfur, and heating the mixture to a temperature of 150° to 220° C. to thermally decompose the polyester to form a mixture of hexadiene acids containing cis-isomers and to isomerize the cis isomers to sorbic acid.

9. A process for isomerizing cis-cis or cis-trans hexadiene(2:4) acids to sorbic acid which comprises incorporating from 0.1 to 10% by weight of sulfur in an isomerization reaction mixture consisting essentially of a high boiling inert solvent solution of a polyester thermally decomposable to yield hexadiene(2:4) acids and heating the reaction mixture at 150° to 220° C. to decompose said polyester to yield hexadiene (2:4) acids and to isomerize cis isomers of said acids to sorbic acid.

References Cited

UNITED STATES PATENTS 2,794,017   5/1957   Palmer et al. _____ 260—97.6

FOREIGN PATENTS 1,042,573   11/1958   Germany _____ 260—526

OTHER REFERENCES

Nozaki et al., J.A.C.S., vol. 63, 2583–6 (1941).
Mayo et al., Chem. Rev., vol. 27, 405 (1940).

LORRAINE A. WEINBERGER, Primary Examiner

V. GARNER, Assistant Examiner

U.S. Cl. X.R.

260—530 N, 533 N